United States Patent [19]

Thomas

[11] Patent Number: 4,460,905

[45] Date of Patent: Jul. 17, 1984

[54] CONTROL VALVE FOR INK JET NOZZLES

[75] Inventor: Jacob E. Thomas, Ithaca, N.Y.

[73] Assignee: NCR Corporation, Dayton, Ohio

[21] Appl. No.: 363,360

[22] Filed: Mar. 29, 1982

[51] Int. Cl.³ .............................................. G01D 15/18
[52] U.S. Cl. .................................... 346/140 R; 346/75
[58] Field of Search .............................. 346/140 R, 75

[56] References Cited

U.S. PATENT DOCUMENTS

| | | | |
|---|---|---|---|
| 3,717,722 | 2/1973 | Messner | 346/75 X |
| 3,805,276 | 4/1974 | Ishii | 346/140 |
| 3,875,574 | 4/1975 | Stone | 346/75 X |
| 4,002,230 | 1/1977 | Schweppe | 346/75 X |
| 4,007,684 | 2/1977 | Takano | 346/75 X |
| 4,038,667 | 7/1977 | Hoi | 346/140 |
| 4,131,899 | 12/1978 | Christou | 346/140 |
| 4,152,710 | 5/1979 | Matsuba | 346/140 |
| 4,210,920 | 7/1980 | Burnett | 346/75 |
| 4,215,350 | 7/1980 | Mielke | 346/75 |
| 4,287,523 | 9/1981 | Thomas | 346/140 |
| 4,323,907 | 4/1982 | Italiano | 346/140 |
| 4,378,564 | 3/1983 | Cross | 346/140 X |

FOREIGN PATENT DOCUMENTS 782710 4/1968 Canada .

*Primary Examiner*—Joseph W. Hartary
*Attorney, Agent, or Firm*—J. T. Cavender; Wilbert Hawk, Jr.; George J. Muckenthaler

[57] ABSTRACT

The valve mechanism controls the flow of ink from a pressurized ink supply to a plurality of ink nozzles for printing bar codes. The mechanism includes a valve ball and a valve seat and an elastic diaphragm is positioned opposite the valve seat and is movable by action of a spring-loaded magnet armature to move the valve ball against the valve seat.

18 Claims, 1 Drawing Figure

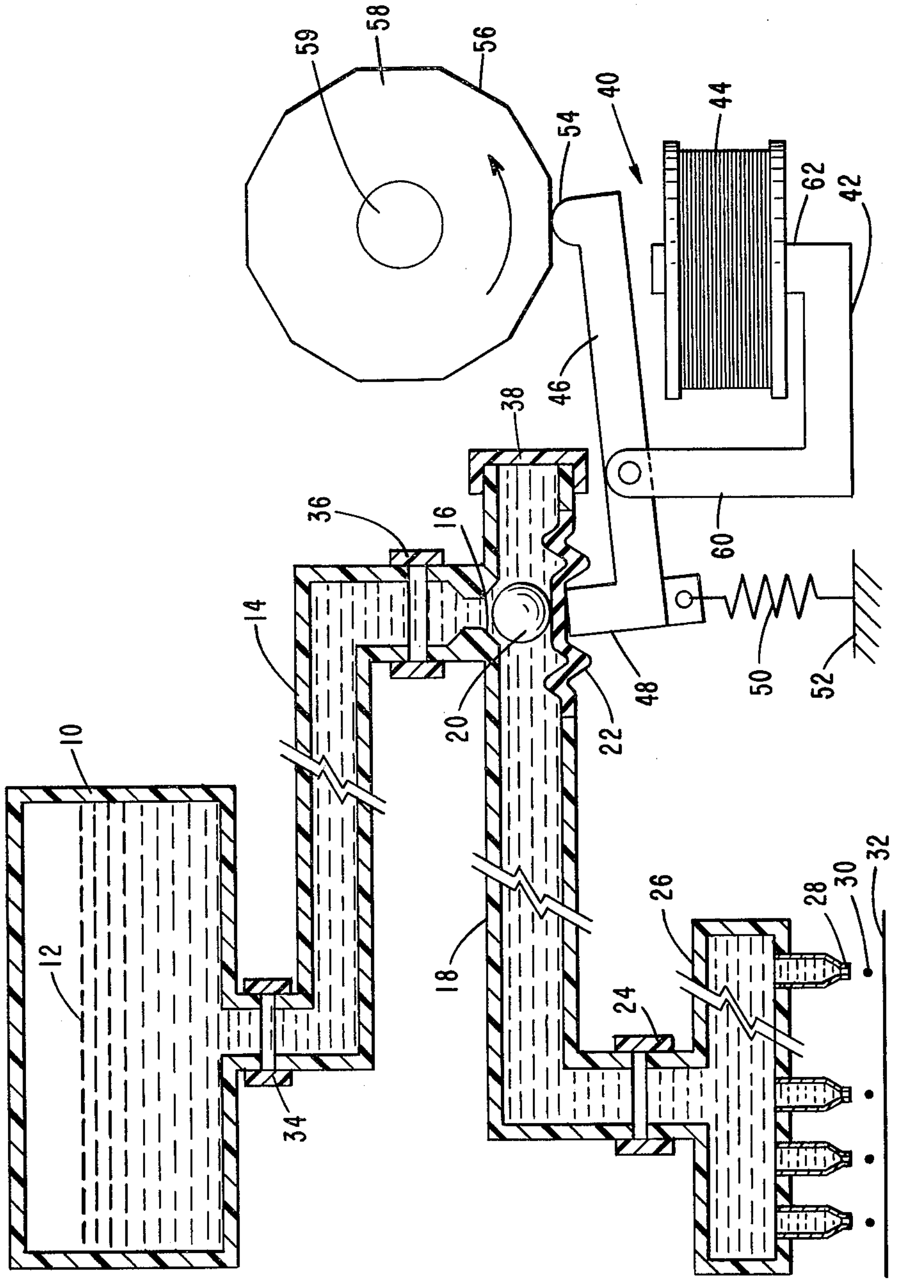
59
58
56
54
40
44
62
42
46
38
36
16
60
14
20
22
48
50
52
10
12
18
26
28
30
32
24
34

CONTROL VALVE FOR INK JET NOZZLES

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case, the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media and to make certain that a clean printed character results from the ink droplets. While the method of printing with ink droplets may be performed in a continuous manner or in a demand pulse manner, the latter type method and operation is disclosed and is preferred in the present application in applying the features of the present invention. The drive means for the ink droplets is generally in the form of a well-known crystal or piezoelectric type element to provide the high-speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner, or the ink droplet drive elements or transducers may be positioned in a circular configuration with passageways leading to the nozzles.

Alternatively, the printer structure may include a plurality of equally spaced, horizontally aligned, single nozzle print heads which are caused to be moved in back-and-forth manner to print successive lines of dots in making up the lines of characters. In this latter arrangement, the drive elements or transducers are individually supported along a line of printing.

A further observation in ink jet printers is that previous and current designs for drop-on-demand ink jet print heads are sensitive to the ingestion of air into or the presence of air in the supply of ink. Even a small air bubble can interrupt or fault the performance of transducers or like devices that expel ink droplets from a nozzle by means of pressure pulses created within an ink-filled chamber or channel.

The use of a fast-acting valve to control the flow of ink to a single ink jet printing nozzle is known, but the concept has been considered costly and impractical. Additionally, the supply of ink to a plurality of ink jet nozzles may be controlled by means of a single control device wherein the nozzles are connected to a common manifold and ink droplet ejection is accomplished by momentarily increasing the pressure in the manifold. After the droplets of ink have been ejected from the nozzles, the ink is replenished at the nozzles from a remote supply by the capillary action of the meniscus at the end of the nozzle. In certain of the control devices, it has been found that some difficulties arise from the capillary action refill or replenish process and there are adverse effects on the performance and reliability of such printers.

Representative documentation in the field of ink control means includes U.S. Pat. No. 3,805,276, issued to H. Ishii on Apr. 16, 1974, which discloses ink jet recording apparatus wherein a valve is positioned between an ink holder and the nozzle for removal of air from the ink during non-printing.

U.S. Pat. No. 3,875,574, issued to J. J. Stone on Apr. 1, 1975, discloses printing of bar codes by an ink drop printer.

U.S. Pat. No. 4,007,684, issued to R. Takano et al. on Feb. 15, 1977, shows an electromagnetic cross valve for controlling the supply direction of the ink.

U.S. Pat. No. 4,038,667, issued to S. L. Hou et al. on July 26, 1977, discloses a pressurized ink jet supply system for an array of ink jets wherein an on-off valve is interposed in the conduit between the ink reservoir and the nozzles and a second valve is positioned in a line between a second source of ink and the conduit.

U.S. Pat. No. 4,152,710, issued to M. Matsuba et al. on May 1, 1979, discloses an electromagnetic cross valve provided for selectively connecting a nozzle with an ink liquid supply conduit and an ink liquid drain conduit.

U.S. Pat. No. 4,210,920, issued to J. E. Burnett et al. on July 1, 1980, discloses a magnetically activated plane wave stimulator wherein a manifold supplies ink to a plurality of orifices formed in rows in an orifice plate. The surface of an ink reservoir is closed by a flexible and magnetically-active diaphragm plate and an electromagnetic device is coupled to the plate to vibrate the diaphragm and the ink to cause droplets of ink to be ejected from the orifices.

U.S. Pat. No. 4,215,350, issued to K. H. Mielke et al. on July 29, 1980, discloses ink jet printing apparatus with different jet spacings wherein each of the nozzles is connected through a solenoid valve to an ink supply and each valve is controlled by a pattern generator which timely selects valves and causes simultaneous pulses.

U.S. Pat. No. 4,323,907, issued to V. J. Italiano on Apr. 6, 1982, discloses a ball valve which is affected by inertia to open and close an ink line from a reservoir to a plurality of ink jet heads.

U.S. Pat. No. 4,287,523, issued to J. E. Thomas et al. on Sept. 1, 1981, discloses a ball valve for a rotary ink jet printer and positioned in an arrangement to control the ink flow from one chamber to another chamber.

And, U.S. Pat. No. 4,415,910, issued to J. W. Reece on Nov. 15, 1983, discloses a ball valve actuated in electromagnetic manner to cause droplets of ink to be ejected onto record media.

SUMMARY OF THE INVENTION

The present invention relates to ink jet printers, and more particularly, to control means in the form of a valve provided in the line between an ink supply tank and a plurality of ink jet nozzles. The ink supply tank is pressurized by suitable and well-known means and the valve is provided to normally close off the tank from a manifold that supplies the several nozzles. The valve is momentarily opened to cause simultaneous ink ejection from all the nozzles.

A magnet is used to hold a ball against a seat to prevent flow of ink and at precise times the magnet is deenergized and a combined effect of the pressure in the supply tank and a tension spring allows the ball to be removed from the seat and ink then flows to the nozzles for printing in bar code manner. An elastic diaphragm is positioned opposite the valve seat and is movable by action of the magnet.

In view of the above discussion, the principal object of the present invention is to provide means permitting controlled amounts of ink to flow for marking or printing on record media.

Another object of the present invention is to provide means for controlling flow of ink from a supply thereof to a plurality of ink jet nozzles.

An additional object of the present invention is to provide single element valve means common to several ink jet nozzles for controlling flow of ink.

A further object of the present invention is to provide the plurality of aligned ink jet nozzles controlled by a common valve operating to print bar code on record media.

Additional advantages and features of the present invention will become apparent and fully understood from a reading of the following description taken together with the annexed drawing.

BRIEF DESCRIPTION OF THE DRAWING

The single FIGURE is a diagrammatic view of a printing system incorporating the subject matter of the present invention.

DESCRIPTION OF THE PREFERRED EMBODIMENT

The single drawing FIGURE illustrates an ink jet printing system which includes a reservoir 10 of fluid-proof plastic material and containing ink 12 which is pressurized by suitable means. A supply tube or conduit 14 is connected to the bottom of the reservoir 10 and is formed to provide a valve seat 16 at the junction of the tube 14 and a second tube or conduit 18. The tubes 14 and 18 are positioned generally parallel with each other and are connected by means of a tube or conduit portion which is perpendicular to the tubes 14 and 18. A valve ball 20 is positioned in the tube 18 for operation with the valve seat 16. In a preferred design, the valve ball 20 is 0.05 inches in diameter and the valve seat 16 has a fluid opening diameter of 0.025 inches. An ink pressure of several pounds per square inch is sufficient to operate the printing system.

The tube 18 includes, as a part thereof and opposite the valve seat 16, a resilient portion or diaphragm 22 supporting the valve ball 20 and the tube 18 also includes a sleeve portion or coupling 24 connected to a manifold 26. The manifold 26 feeds the ink 12 to a plurality of ink jet nozzles 28 which may be of well-known type for ejecting droplets 30 of ink in demand manner on paper or like record media 32. It is understood, of course, that the nozzles 28 are closely spaced in actual practice for enabling the printing of bar codes or other character lines on the paper 32.

The tube 14 may also include an elastic or resilient coupling 34 connected with the reservoir 10 and another elastic or resilient coupling 36 just above the valve seat 16. The elastic or resilient members 34 and 36 provide for limiting the amount of ink 12 that is delivered to the valve seat 16 without acceleration of all the ink within the ink supply system. Additionally, the tube 18 may include an elastic or resilient cap 38 to aid in controlling the motion of the ink adjacent the valve ball 20.

A magnet 40 consisting of a yoke 42, a coil 44 and an armature 46 is operably associated with the elastic diaphragm 22. The armature 46 has a finger 48 engageable with the diaphragm 22 and a spring 50 is connected to the finger 48 and to a frame 52 to provide tension in a manner tending to move the finger in a direction from the diaphragm. The armature 46 also has a projection 54 at the end opposite the finger 48 for engagement with the surface 56 of a reset cam 58. The cam 58 has twelve of the surfaces 56 with each surface representing an angle of 30 degrees and the cam is carried on a shaft 59 driven in continuous rotation by a suitable motor (not shown).

In the operation of the printing system, the magnet 40 is normally energized to hold the valve ball 20 against the valve seat 16. The elastic diaphragm 22, being positioned between the finger 48 and the valve ball 20, enables or permits the ball to move a small and precise distance in an up and down direction in the tube 18. The armature 46 is pivoted with respect to one leg 60 of the magnet yoke 42 and the coil 44 is wound around another leg 62 of the yoke. At a selected time in the cycle of rotation of the cam 58, as more fully described hereinbelow, the magnet 40 is deenergized by interruption of current thereto, and the combined effect of the pressurized ink in the tube 14 and of the tension in the spring 50 causes and enables the valve ball 20 to be removed from the valve seat 16. Such opening of the valve allows ink 12 to flow therethrough to the nozzles 28 and in droplet form therefrom and onto the paper 32.

It is extremely important that the open time of the valve be carefully controlled and in the embodiment shown, the valve is quickly reclosed by the cam 58 at a point in time which is 5–10 degrees of cam rotation after opening of the valve. Alternative control apparatus for the actuation of the ball valve 20 could be the use of a voice coil or like structure.

It should also be noted that a photosensor and a marked code wheel or like mechanism operably connected with the cam motor shaft can be used to control the valve timing in opening and closing thereof. The photosensor feeds synchronizing signals to a code generator which operates through a programmable computer type circuit to actuate the magnet 40 at appropriate and predetermined times. The time cycles would be programmed in manner and form to make the bar shaped marks on the paper 32 which, it should be noted, moves at a constant velocity at a right angle to the row of nozzles 28. The phase of the marks on the code wheel in relation to the flat surfaces 56 on the cam 58 would then control the duration of each opening of the valve. When the point between surfaces 56 on the cam 58 closes the valve ball 20 against the seat 16, the magnet 40 is energized to hold the valve closed until ink is to be again supplied to the nozzles 28 for printing of the next character line or bar of the code.

It can be noted that certain parameters of the invention include printing at a rate of 770 droplets per second from each of the eight closely-spaced nozzles 28. The pressure on the ink 12 is less than one atmosphere and a force of several grams is thus imposed on the valve ball 20 which weighs a few milligrams. The cam 58 is approximately one inch in diameter and is driven at 3,850 RPM.

It has been found that the required time between openings of the valve for printing certain bar codes is 1.3 milliseconds, however, it is within the realm of magnetic structures of the disclosed type to effect operation of the valve within 200 microseconds. Thus, in certain other character printing, it may also be entirely possible to operate and control the valve exclusively by means of the magnet 40 and without the aid of the cam 58. In this respect a magnet gap could be disposed below the valve ball 20, the armature 46 could be rigidly connected or like secured to the diaphragm 22 and the magnet 40 could be momentarily energized to open the valve. The magnet operation would be opposite to that shown in the drawing.

Dependent upon the apparatus used and the operation thereof, it may thus be seen that the valve is opened and closed by control of the current in the magnet coil or winding, or alternately, that the valve is opened by a change in current in the magnet coil or winding and then is closed by mechanical action of the continuously rotating cam.

While the use of plastic material is shown and described, alternate materials could be used for certain parts. The couplings 34 and 36 may be made of any suitable elastomer such as polyethylene or polyvinyl, or their function could be provided by flexible metal, fluid proof members. The tubes 14 and 18 preferably are plastic, as shown, but can be metallic to provide certain rigidity to the apparatus. Tube 18, coupling 24 and manifold 26 must be rigidly and securely connected to accurately control the position of the nozzles 28 relative to the moving paper during printing of the bar codes. These elements may be made of metallic stainless steel, of hard plastic polyethylene or of glass. It is further noted that the diaphragm 22 may be a spring metal such a stainless steel, phosphor bronze or beryllium copper, or alternatively, could be fiber or fabric-reinforced plastic.

It is thus seen that herein shown and described is an ink jet printing system which includes a control valve within the ink supply line to control the ink flow to a plurality of nozzles operated to print bar codes or other character lines. The apparatus and arrangement enables the accomplishment of the objects and advantages mentioned above, and while a preferred embodiment has been disclosed herein, variations thereof may occur to those skilled in the art. It is contemplated that all such variations not departing from the spirit and scope of the invention hereof, are to be construed in accordance with the following claims.

I claim:

1. A control system for an ink jet printer having a pressurized supply of ink for delivery to a plurality of aligned ink jet nozzles, comprising first conduit means connected with said ink supply for carrying ink therefrom, second conduit means having a resilient portion and directly connected with said first conduit means for carrying ink to said ink jet nozzles, valve means within the second conduit means and positioned at the confluence of said first and second conduit means for controlling the flow of ink therethrough, and means operably associated with the resilient portion for controlling said valve means for enabling droplets of ink to be ejected from said nozzles in response to operation of said valve means and printing on record media in dot matrix manner.

2. The control system of claim 1 wherein said first conduit means includes resilient coupling portions for connecting with said ink supply and with said second conduit means.

3. The control system of claim 1 including a manifold connected with said second conduit means for distributing ink to said nozzles.

4. The control system of claim 1 wherein said valve means comprises a valve seat formed at the intersection of said first conduit means and said second conduit means and a valve ball within said second conduit means and operating with said valve seat.

5. The control system of claim 1 wherein said second conduit means includes a resilient wall portion positioned adjacent said valve means and operably movable by said controlling means for opening and closing the valve means.

6. The control system of claim 1 wherein said controlling means includes a magnetic member operably associated with said valve means.

7. The control system of claim 5 wherein said controlling means includes a magnet having an armature engageable with said resilient wall portion.

8. The control system of claim 1 wherein said controlling means includes cam means operably associated with and rotatable for operably closing said valve means.

9. The control system of claim 1 wherein said controlling means includes a magnetic member and a resilient member interconnected and operable for opening and closing said valve means.

10. An ink jet printer comprising pressurized supply of ink, a plurality of aligned ink jet nozzles, a first conduit connected with said ink supply for carrying ink therefrom, a second conduit having an elastic portion and directly connected with said first conduit and with said ink jet nozzles.

valve means within said second conduit and positioned at the junction of the first and second conduits for controlling the flow of ink therepast, and control means operably associated with the elastic portion and controlling said valve means for opening and closing thereof to enable ink to flow to said nozzles in response to operation of said valve means for forming droplets of ink and printing bar codes on record media.

11. The ink jet printer of claim 10 wherein said valve means comprises a valve seat formed at the junction of said first and second conduits and a valve ball within said second conduit and operating with said valve seat.

12. The ink jet printer of claim 10 wherein said second conduit includes an elastic portion in the wall thereof adjacent said valve means and operably connected with said control means.

13. The ink jet printer of claim 10 wherein said control means includes an electromagnet operably associated with said valve means.

14. The ink jet printer of claim 12 wherein said control means includes an armature pivotally engageable with said elastic diaphragm.

15. The ink jet printer of claim 10 wherein said control means includes a rotatable cam member operably connected with for operably closing said valve means.

16. The ink jet printer of claim 10 wherein said control means includes an electromagnet and a resilient member interconnected and operable for opening and closing said valve means.

17. The ink jet printer of claim 10 wherein said control means includes an armature and a cam member having a plurality of surfaces with connecting points thereon engageable with said armature for operating said valve means.

18. The ink jet printer of claim 10 wherein said valve means comprises a valve seat formed at the junction of said first and second conduits and a valve ball within said second conduit and wherein said control means comprises an electromagnet having a pivotable armature operable for moving said valve ball relative to said valve seat.

* * * * *